(12) United States Patent
Macaluso (10) Patent No.: US 9,998,585 B2
(45) Date of Patent: Jun. 12, 2018

(54) CONTENT SELECTION AND DELIVERY OF COMPLEMENTARY INFORMATION

(75) Inventor: Anthony G. Macaluso, Rancho Santa Fe, CA (US)

(73) Assignee: SITO Mobile R&D IP, LLC, Jersey City, NJ (US)

( * ) Notice: Subject to any disclaimer, the term of this patent is extended or adjusted under 35 U.S.C. 154(b) by 1332 days.

(21) Appl. No.: 11/413,241

(22) Filed: Apr. 28, 2006

(65) Prior Publication Data

US 2006/0223576 A1    Oct. 5, 2006

Related U.S. Application Data

(60) Provisional application No. 60/724,227, filed on Oct. 5, 2005.

(51) Int. Cl.
*H04M 1/72* (2006.01)
*H04M 1/725* (2006.01)

(52) U.S. Cl.
CPC ... *H04M 1/72563* (2013.01); *H04M 1/72525* (2013.01)

(58) Field of Classification Search
USPC .................................................. 455/445, 466
See application file for complete search history.

(56) References Cited

U.S. PATENT DOCUMENTS

| | | |
|---|---|---|
| 3,600,522 A | 8/1971 | Benson |
| 3,975,595 A | 8/1976 | Berube et al. |
| 4,600,812 A | 7/1986 | Gerlits |
| 5,131,020 A | 7/1992 | Liebesny et al. |
| 5,214,793 A | 5/1993 | Conway et al. |
| 5,216,703 A | 6/1993 | Roy |
| 5,282,238 A | 1/1994 | Berland |
| 5,307,400 A | 4/1994 | Sawyer et al. |
| 5,365,582 A | 11/1994 | Yamada et al. |
| 5,418,844 A | 5/1995 | Morrisey et al. |
| 5,422,656 A | 6/1995 | Allard et al. |
| 5,524,146 A | 6/1996 | Morrisey et al. |

(Continued)

OTHER PUBLICATIONS

Final Office Action dated Oct. 19, 2010 regarding U.S. Appl. No. 11/752,503, 11 pages.

(Continued)

*Primary Examiner* — Steven Kelley (74) *Attorney, Agent, or Firm* — James M. Stipek; Polsinelli PC (57) ABSTRACT

A telephone call may be established with a mobile communications device in response to a user dialing an abbreviated dialing code. Content provided external to the mobile communications device associated with the abbreviated dialing code may be identified. Thereafter, a message may be sent to the mobile communications device including a pointer to information complementary to the identified content, wherein the pointer when activated at the mobile communications device, determines one more operational parameters associated with the mobile communications device and causes data associated with the identified content to be transmitted to the mobile communications device in a format compatible with the determined one or more operational parameters. Related methods, apparatuses, computer-program products, and systems are also described.

77 Claims, 5 Drawing Sheets

(56) References Cited

U.S. PATENT DOCUMENTS

| | | | |
|---|---|---|---|
| 5,583,926 A | 12/1996 | Venier et al. | |
| 5,594,779 A | 1/1997 | Goodman | |
| 5,604,682 A | 2/1997 | McLaughlin et al. | |
| 5,752,186 A | 5/1998 | Malackowski et al. | |
| 5,758,286 A | 5/1998 | Leppanen | |
| 5,768,358 A | 6/1998 | Venier et al. | |
| 5,778,313 A | 7/1998 | Fougnies | |
| 5,867,780 A | 2/1999 | Malackowski et al. | |
| 5,898,917 A | 4/1999 | Batni et al. | |
| 6,154,648 A | 11/2000 | Comer | |
| 6,169,897 B1* | 1/2001 | Kariya | 455/456.3 |
| 6,327,355 B1* | 12/2001 | Britt | 379/201.03 |
| 6,366,791 B1* | 4/2002 | Lin et al. | 455/567 |
| 6,397,057 B1 | 5/2002 | Malackowski et al. | |
| 6,411,803 B1 | 6/2002 | Malackowski et al. | |
| 6,487,663 B1* | 11/2002 | Jaisimha et al. | 713/193 |
| 6,490,432 B1* | 12/2002 | Wegener et al. | 455/3.05 |
| 6,560,640 B2* | 5/2003 | Smethers | 709/219 |
| 6,714,778 B2* | 3/2004 | Nykanen et al. | 455/414.1 |
| 6,829,233 B1* | 12/2004 | Gilboy | 370/352 |
| 6,839,556 B2 | 1/2005 | Malackowski et al. | |
| 6,850,986 B1* | 2/2005 | Peacock | 709/232 |
| 6,990,472 B2 | 1/2006 | Rosenhaft et al. | |
| 7,010,306 B1* | 3/2006 | Tanibayashi et al. | 455/456.1 |
| 7,020,685 B1* | 3/2006 | Chen et al. | 709/204 |
| 7,035,620 B2* | 4/2006 | Ben-Efraim et al. | 455/412.1 |
| 7,092,370 B2* | 8/2006 | Jiang et al. | 370/329 |
| 7,103,315 B2* | 9/2006 | Wilkinson | 455/3.1 |
| 7,165,224 B2* | 1/2007 | Pyhalammi | 715/748 |
| 7,170,864 B2* | 1/2007 | Matharu | 370/310 |
| 7,181,200 B2 | 2/2007 | Malackowski et al. | |
| 7,257,391 B2 | 8/2007 | Burgess et al. | |
| 7,266,380 B2* | 9/2007 | Ashmore et al. | 455/456.3 |
| 7,336,777 B2* | 2/2008 | Lee et al. | 379/207.08 |
| 7,363,035 B2* | 4/2008 | Reilly | 455/432.3 |
| 7,369,533 B1* | 5/2008 | Raman | 370/349 |
| 7,369,700 B2* | 5/2008 | Neumann et al. | 382/181 |
| 7,376,584 B1* | 5/2008 | Weixel | 705/17 |
| 7,403,743 B2* | 7/2008 | Welch | 455/41.1 |
| 7,440,772 B2* | 10/2008 | White et al. | 455/556.2 |
| 7,441,192 B2 | 10/2008 | Pisz | |
| 7,512,398 B2 | 3/2009 | Chambers et al. | |
| 7,519,360 B2* | 4/2009 | Maeda et al. | 455/419 |
| 7,519,397 B2* | 4/2009 | Fournier et al. | 455/563 |
| 7,519,680 B1* | 4/2009 | O'Neil | 709/217 |
| 7,570,943 B2* | 8/2009 | Sorvari et al. | 455/414.1 |
| 7,643,821 B2* | 1/2010 | O'Hanlon | 455/414.1 |
| 7,783,729 B1* | 8/2010 | Macaluso | G06F 8/63 455/414.2 |
| 7,813,716 B2 | 10/2010 | Malackowski et al. | |
| 7,865,447 B2 | 1/2011 | Rosenhaft et al. | |
| 8,041,341 B1 | 10/2011 | Malackowski et al. | |
| 8,494,493 B2* | 7/2013 | Macaluso | G10H 1/0058 455/410 |
| 2001/0027378 A1 | 10/2001 | Tennison et al. | |
| 2001/0043684 A1* | 11/2001 | Guedalia et al. | 379/88.17 |
| 2001/0055951 A1* | 12/2001 | Slotznick | 455/41 |
| 2002/0077085 A1* | 6/2002 | Kalish et al. | 455/414 |
| 2002/0132617 A1* | 9/2002 | Nuss et al. | 455/422 |
| 2003/0032456 A1* | 2/2003 | Mumick et al. | 455/566 |
| 2003/0036376 A1* | 2/2003 | Annan et al. | 455/406 |
| 2003/0109251 A1 | 6/2003 | Fujito et al. | |
| 2003/0130864 A1* | 7/2003 | Ho et al. | 705/1 |
| 2003/0139193 A1* | 7/2003 | Buckley | 455/466 |
| 2004/0005874 A1 | 1/2004 | Malackowski et al. | |
| 2004/0110490 A1* | 6/2004 | Steele et al. | 455/412.1 |
| 2004/0142656 A1* | 7/2004 | Bensimon et al. | 455/3.06 |
| 2004/0166834 A1 | 8/2004 | Omar et al. | |
| 2005/0025133 A1* | 2/2005 | Swartz | 370/352 |
| 2005/0043020 A1* | 2/2005 | Lipsanen et al. | 455/422.1 |
| 2005/0074028 A1* | 4/2005 | Wugofski et al. | 370/468 |
| 2005/0075093 A1* | 4/2005 | Lei et al. | 455/412.1 |
| 2005/0091683 A1 | 4/2005 | Sheynman et al. | |
| 2005/0130638 A1* | 6/2005 | Schrader | 455/416 |
| 2005/0131837 A1* | 6/2005 | Sanctis | G06Q 20/12 705/64 |
| 2005/0188027 A1 | 8/2005 | Clarke et al. | |
| 2005/0197167 A1* | 9/2005 | Aoike | H04M 19/041 455/567 |
| 2005/0197964 A1* | 9/2005 | Duggan | 705/57 |
| 2006/0084504 A1 | 4/2006 | Chan et al. | |
| 2006/0089914 A1* | 4/2006 | Shiel et al. | 705/52 |
| 2008/0004079 A1* | 1/2008 | Macaluso | G10H 1/0058 455/564 |
| 2008/0037452 A1* | 2/2008 | Tunmer et al. | 370/310 |
| 2008/0232572 A1* | 9/2008 | Macaluso | H04M 3/42144 379/216.01 |
| 2009/0128335 A1* | 5/2009 | Leung | G06Q 30/02 340/572.1 |
| 2009/0239557 A1* | 9/2009 | Kadakia | H04H 20/34 455/466 |

OTHER PUBLICATIONS

Non-Final Office Action dated Jan. 20, 2010 regarding U.S. Appl. No. 11/752,503, 10 pages.

\* cited by examiner

CONTENT SELECTION AND DELIVERY OF COMPLEMENTARY INFORMATION

CROSS-REFERENCE TO RELATED APPLICATIONS

The present application is a provisional of U.S. Patent Application No. 60/724,227, entitled Content Selection and Delivery of Complementary Information, filed on Oct. 5, 2005, which is incorporated herein in its entirety.

TECHNICAL FIELD

The subject matter described herein relates to the selection of content and delivery of information complementary to the selected content.

BACKGROUND

Mobile communications devices, such as cellular telephones, are increasing being utilized to provide content to users. In some instances, such content may be complementary to traditional print and broadcast media. For example, an advertisement broadcast over radio may include a URL for a website for the product or service being advertised. However, the interfaces on most mobile communications devices are cumbersome and make it difficult to traverse websites in order to obtain desired information. Moreover, such information is often not optimized based on one or more operational parameters associated with the mobile communications device.

SUMMARY

In a first aspect, a telephone call may be established with a mobile communications device which was initiated in response to a user dialing an abbreviated dialing code (e.g., a radio or print media advertisement identifying #147 as a dialing code). After the telephone call is established, content provided external to the mobile communications device associated with the abbreviated dialing code may be identified (e.g., the radio or print media advertisement). A message may then be sent to the mobile communications device including a pointer to information complementary to the identified content. The pointer when activated at the mobile communications device, determines one more operational parameters associated with the mobile communications device and causes data associated with the identified content to be transmitted to the mobile communications device in a format compatible with the determined one or more operational parameters. Alternatively, the information complementary to the identified content may be directly sent to the mobile communications device.

It will be appreciated that a single advertisement may include multiple abbreviated dialing codes, each being associated with one or more distinct resources. For example, a single television advertisement may include a top ten ringtone list which identifies the most requested ringtones with each such ringtone having a unique abbreviated dialing code. In addition, there may be distinct interfaces used to identify a user for each of the abbreviated dialing codes which may be based on factors such as the ringtone, language (e.g., English, Spanish, etc.), and the like.

In some variations, the one or more operating parameters are determined when the telephone call is established. The determined one or more operational parameters may include one or more of a wireless network carrier, a wireless data transport protocol, a hardware configuration of the mobile communications device, a software execution platform for the mobile communications device, and a software application resident on the mobile communications device.

In another aspect, a voice telephone call may be established in response to a user entering an abbreviated dialing code into a mobile communications device. An interactive voice response interface may then be provided to allow for the identification of the user (and/or billing information associated with the user) and a resource (e.g., ringtone, webpage, video file, video game or other software application, etc.) that is associated with the abbreviated dialing code. Thereafter, a message may be sent to the user including a pointer to a desired resource. The mobile communications device may be polled to determine one or more operational parameters associated with the device in response to an attempt to access the pointer (or optionally beforehand). Subsequently, data associated with the desired resource may be transmitted to the mobile communications device in a format compatible with the determined one or more operational parameters.

In a further aspect, a telephone call may be initiated on a wireless voice network between a mobile communications device and a first server. Thereafter, the first server may identify content desired by the mobile communications device (using, for example, a telephone dialing code utilized by a user of the mobile communications device when initiating the voice telephone call). The first server may then send a message containing a pointer to data associated with the content via a wireless data network to the mobile communication device. The mobile communications device may seek to obtain the information identified by the pointer from a second server (or optionally the first server) via a network such as the Internet. The second server may then determine one or more operational parameters associated with the mobile communications device. After this determination has been made, the second server may then provide the data identified in the pointer to the mobile communications device in a format compatible with the one or more determined operational parameters.

In still another interrelated aspect, an audio broadcast (e.g., a simulcast of a concert) may be delivered to a mobile communications device. During the broadcast, a request for a ringtone may be received from the mobile communications device. This request may be associated with a time window or segment of the audio broadcast such that a ringtone may be generated for the mobile communications device based on the time window and subsequently delivered to the mobile communications device for installation.

In a further interrelated aspect, a voice telephone call may be established in response to a user entering an abbreviated dialing code into a mobile communications device. Thereafter, an identity of the user as well as a desired resource associated with the abbreviated dialing code may be determined. This determination may occur, for example, by using an interactive voice response interface that queries the user. Once this information is obtained, a message may be sent to a server identifying the resource, the user, and a delivery channel associated with the user. In one variation, a user responds to an advertisement for a product, such as pet food. By dialing an abbreviated code mentioned in the advertisement, a user may provide identification information and optionally information to identify the pet food. Thereafter, a coupon for the pet food may be transmitted to the user's mobile communication device, e-mail address, and/or a physical coupon may be sent to a mailing address for the user.

Computer program products, tangibly embodied in information carriers are also described. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

The subject matter described herein provides many advantages. For example, the subject matter described herein may be simultaneously used in connection with different wireless carriers (Verizon, Cingular, etc), different transport technologies (CDMA, GMS, GPRS, EdVO, etc.), different mobile devices (Sony Ericsson, Samsung, Nokia, etc.), and/or software execution platforms (Java, Brew).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
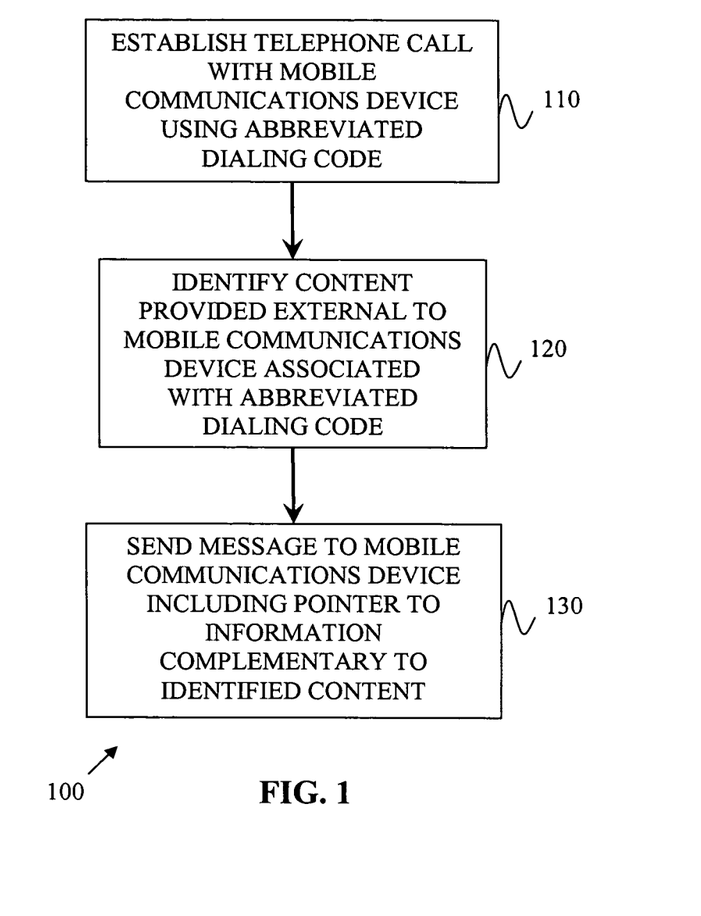
FIG. 1 is a process flow diagram illustrating a first method for delivering complimentary content to a mobile communications device in response to dialing an abbreviated dialing code.

With reference to FIG. 1, a method 100 is illustrated in which at 10, a telephone call with a mobile communications device is established. This telephone call may be initiated in response to a user dialing an abbreviated dialing code. Thereafter, at 120, content provided external to the mobile communications device associated with the abbreviated dialing code is identified. Subsequently, at 130, a message is sent to the mobile communications device including a pointer to information complementary to the identified content. This pointer, when activated (and/or when data associated with the pointer is sought) by the mobile communications device, causes one or more operational parameters associated with the mobile communications device to be determined so that data associated with the identified content can be transmitted to the mobile communications device in a format compatible with the determined one or more operational parameters.

In some variations, the operational parameters might include: different wireless carriers (Verizon, Cingular, etc), different transport technologies (CDMA, GMS, GPRS, EdVO, etc.), different mobile devices (Sony Ericsson, Samsung, Nokia, etc.), software execution platforms (Java, Brew, IDEN, MMS, etc.), and the like. The operational parameters may be determined, for example, by having a server associated with the service being provided poll the mobile communications device to determine one or more of the parameters. Optionally, information, such as the wireless carrier and transport technology may be determined when the call is established.

The operational parameters may also be determined based on, for example, the telephone number of the mobile communications device. In some variations, a user may access a website or complete an off-line registration process with a service provider in which one or more of the operational parameters are provided. Thereafter, when a call is received from the mobile communications device, a database associated with a plurality of users may be polled using the telephone number in order to determine a proper format to convey the data associated with the content to the mobile communications device. Alternatively, a user may also specify that in lieu of transmission to the mobile communications device, other delivery outlets for the data may be utilized such as an e-mail address or a postal address (which would entail sending brochure, CD, video, and the like to the user).

Figure 2:
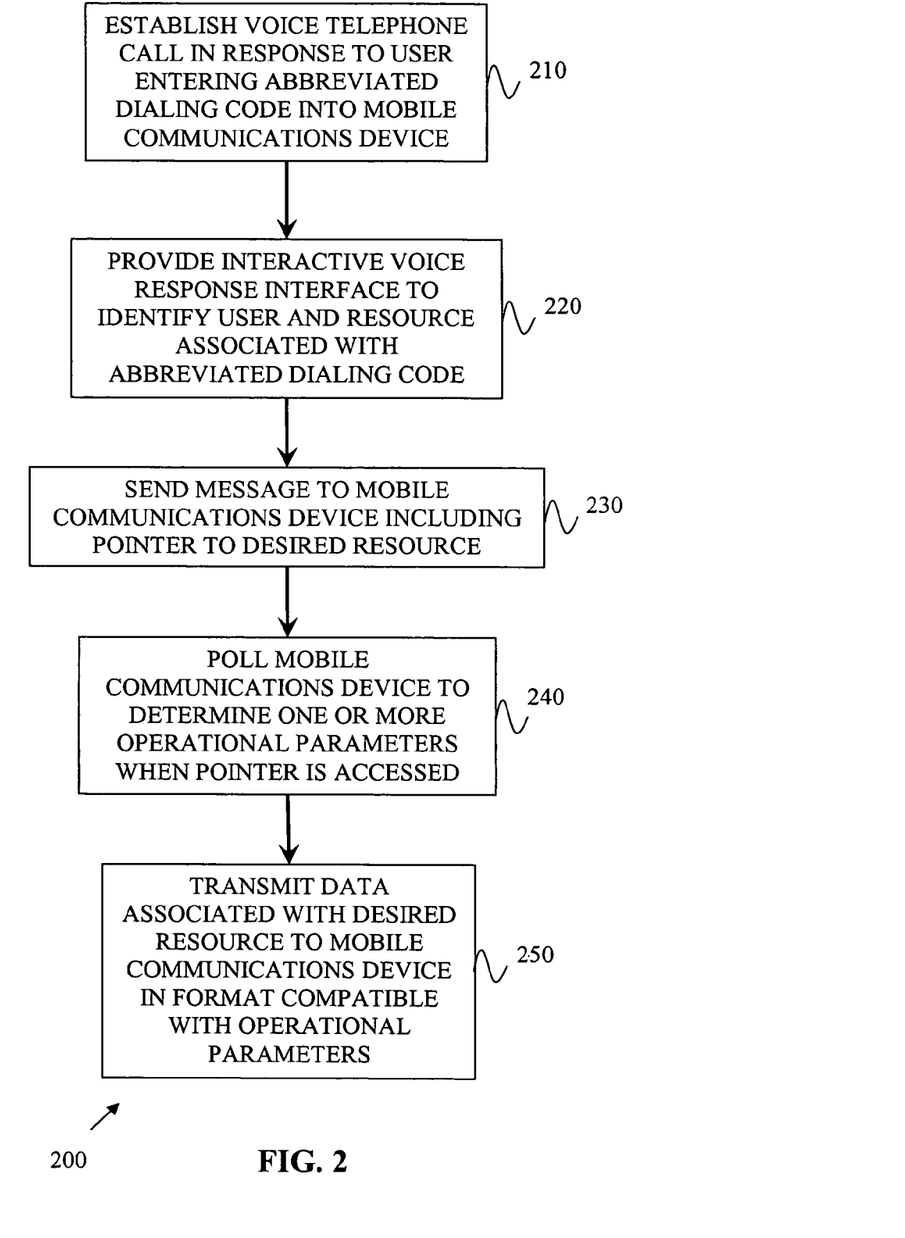
FIG. 2 is a process flow diagram illustrating a first method for delivering complimentary content to a mobile communications device in response to dialing an abbreviated dialing code.

FIG. 2 illustrates a method 200, in which, at 210, a voice telephone call is established in response to a user entering an abbreviated dialing code into a mobile communications device. At 220, an interactive voice response interface is provided that allows for the identification of the user and a resource that is associated with the abbreviated dialing code. Thereafter, at 230, a message is sent to the mobile communications device including a pointer to a desired resource. The mobile communications device is polled (e.g., via a script), at 240, to determine one or more operational parameters associated with the device in response to an attempt to access the pointer. Subsequently, at 250, data associated with the desired resource is transmitted to the mobile communications device in a format compatible with the determined one or more operational parameters.

Figure 3:
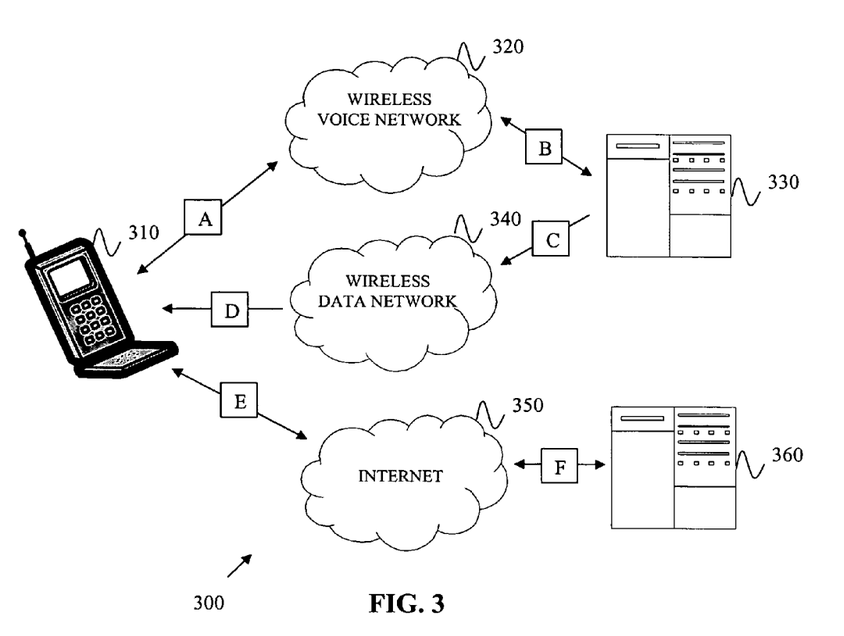
FIG. 3 is a schematic diagram illustrating the delivery of complimentary content to a mobile communications device in response to dialing an abbreviated dialing code.

FIG. 3 illustrates a schematic diagram 300 in a telephone call is initiated on a wireless voice network 320 between a mobile communications device 310 and a first server 330 (A-B). The first server 330 is operable to identify content desired by the mobile communications device (using, for example, a key pad entry menu tree, an interactive voice recognition arrangement, and the like). The first server 330 is operable to send a message to the mobile communications device 310 containing a pointer to data associated with the content via a wireless data network 340 (C-D). After receiving this message, the mobile communications device 310 may be operable to seek or otherwise request the data identified by the pointer via the Internet 350. (or other data communications network) from a second server 360. The second server 360 may then be operable to determine one or more operational parameters associated with the mobile communications device 350 and provide, or cause to be provided (e.g., by another server), the data identified in the pointer to the mobile communications device 350 in a format compatible with the one or more determined operational parameters.

Figure 4:
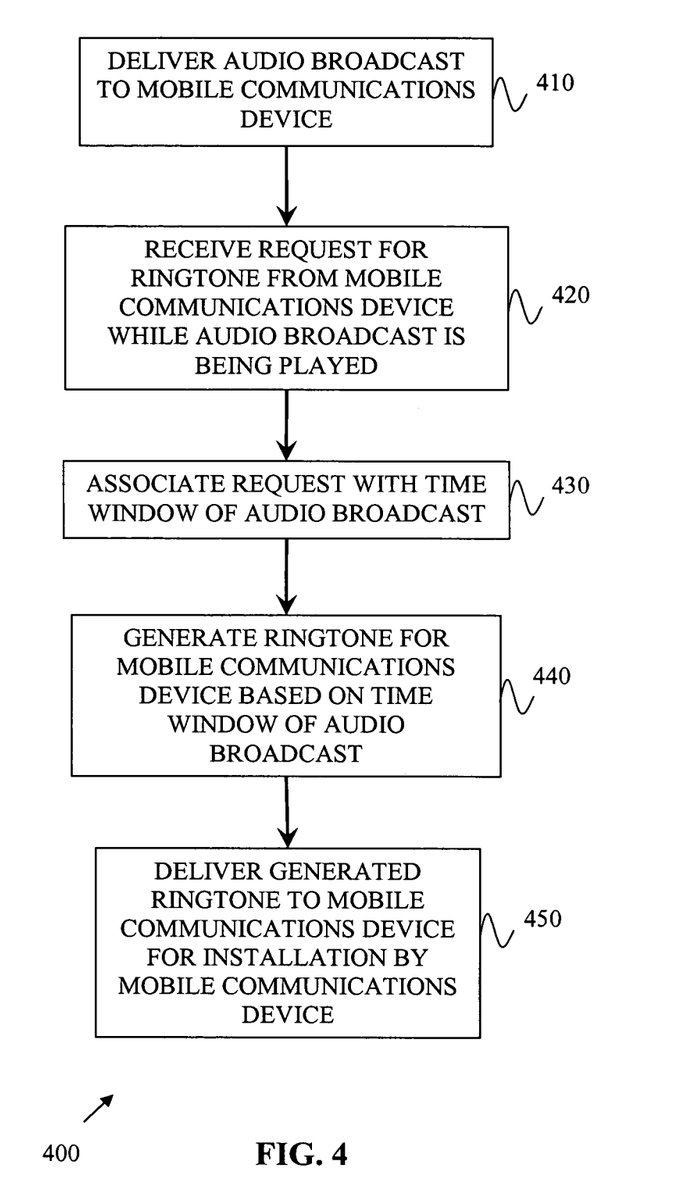
FIG. 4 is a process flow diagram illustrating a method for generating a ringtone for a mobile communications device based on an audio broadcast.

FIG. 4 illustrates a method 400 that, at 410, delivers an audio broadcast to a mobile communications device. While the audio broadcast is being played on the mobile communications device, at 420, a request for a ringtone is received. This request is associated, at 430, with a time window (e.g., segment) of the audio broadcast. Thereafter, at 440, a ringtone is generated for the mobile communications device based on the time window of the audio broadcast. Once the ringtone has been generated, at 450, it is delivered to the mobile communications device for installation.

Figure 5:
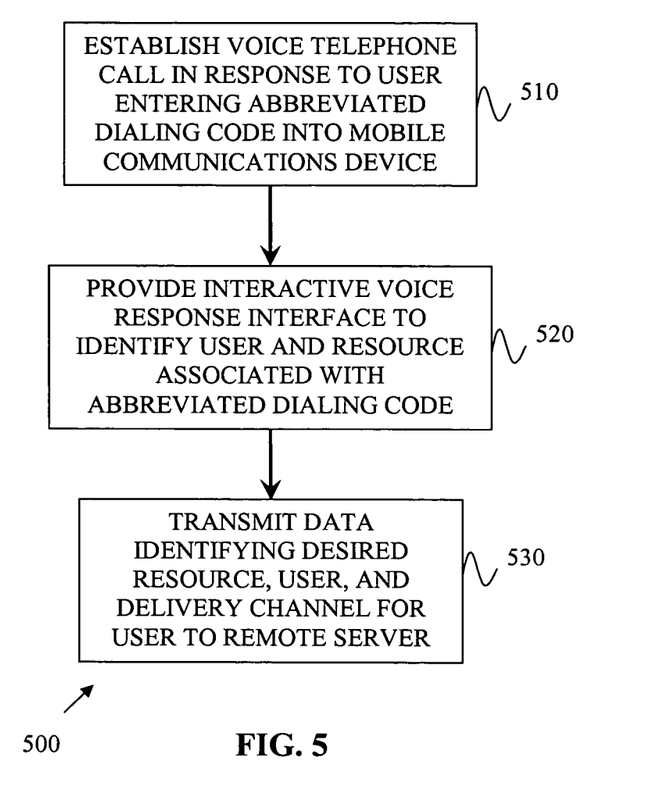
FIG. 5 is a process flow diagram illustrating a method for generating a transaction from a voice-based mobile communications device.

FIG. 5 illustrates a method 500 in which, at 510, a voice telephone call is established in response to a user entering an abbreviated dialing code into a mobile communications device. Thereafter, at 520, an interactive voice response interface is provided to allow for the identification of the user and a resource that is associated with the abbreviated dialing code. At 530, a message is sent to a remote server identifying the resource, the user, and a delivery channel associated with the user. The message may be used to generate data for delivery to the mobile communications device and/or an e-mail address associated with the user. In other variations, the message may be used to generate a coupon or other printed material to be mailed to a postal address associated with the user. Alternately, information may be sent directly to the user (whether via the mobile communication device, e-mail, postal mail, etc.) in response to the identification of the resource, the user, and the delivery channel.

In one variation, a user may hear a disc jockey on a radio broadcast call out after a song is played: "to download Don't Phunk With My Heart dial #147 on your Cingular phone now." Thereafter, the listener dials #147 on their mobile phone and an optimized ringtone is delivered to the customer. In other variations, a user may hear or see a TV commercial or billboard stating: "Dial #147 on your phone and get more information on the new Cadillac STS." With such variations, the #147 system automatically identifies the caller name, address, and phone number and delivers a customer's name and address electronically to Cadillac in exchange for a fee. The consumer has opted in for this information and looks forward to receiving the information via mail.

In yet another variation, a radio station would promote #147 (on air, billboard etc.) leading up to a concert being broadcast to mobile phones such as advertisement stating: "Dial #147 to Listen Live to U2 September 8th in Las Vegas." The user would dial #147 and order the event; then, moments before the concert starts, the user's phone rings. When the user answers he hears the roar of the crowd and a voice over that says: "You're listening live to U2, to order a ringtone from today's live event press 1 now." The #147 technology manages Digital Rights Management and, therefore, has the ability to record a live concert clip of the user's choosing and dynamically convert that clip into a ringtone which can be delivered to the user's phone moments after the concert and billed to the users cell phone bill.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In particular, the determination of one or more parameters regarding the content may be determined during the initialization of the phone call. In addition, complementary information may be directly delivered to the mobile communications device in a compatible format (as opposed to a pointer). Other embodiments may be within the scope of the following claims.

What is claimed is:

1. A method for transmitting data to a mobile communications device comprising:
   in response to a telephone call initiated from the mobile communications device using an abbreviated dialing code, identifying, by at least one server, content located external to the mobile communications device associated with the abbreviated dialing code from a plurality of content each associated with a unique abbreviated dialing code;
   sending a message to the mobile communications device, the message including a pointer to information complementary to the identified content;

identifying one or more operational parameters associated with the mobile communications device by the at least one server by polling the mobile communications device in response to the pointer being activated at the mobile communications device and after the telephone call has been initiated, the one or more operational parameters being identified only after the telephone call has been initiated and the one or more operational parameters including at least one of a wireless network carrier identification, a mobile communications device type, a software execution platform, and a software application resident on the mobile communications device; and transmitting data associated with the identified content to the mobile communications device in a format compatible with the identified one or more operational parameters, wherein the data associated with the identified content is a ringtone generated from at least a portion of an audio broadcast transmitted to the mobile communications device, the portion of the audio broadcast being determined based on a timing of a request for the ringtone from the mobile communications device during the audio broadcast.

2. A method as in claim 1, wherein the identified one or more operational parameters consist of the software execution platform for the mobile communications device.

3. A method as in claim 1, wherein the abbreviated dialing code comprises at least one number and at least one symbol.

4. A method as in claim 1, further comprising receiving the telephone call at the at least one server via a wireless voice network.

5. A method as in claim 1, wherein the abbreviated dialing code is associated with at least one product or service, the content comprises data associated with the at least one associated product or service, and identifying the content comprises identifying the data associated with the abbreviated dialing code.

6. A method as in claim 1, wherein the content comprises a ringtone.

7. A method as in claim 1, further comprising: identifying a user using a telephone number associated with the mobile communications device.

8. A method as in claim 1, wherein the abbreviated dialing code has fewer characters than an ordinary telephone number and comprises a non-alphabetic/non-numeric character as a first character.

9. A method as in claim 1, wherein the abbreviated dialing code has fewer characters than an ordinary telephone number and comprises a # character as a first character.

10. A method as in claim 1, further comprising identifying the content using the abbreviated dialing code.

11. A method as in claim 1, wherein the identified content comprises another software application for the mobile communications device, the method comprising sending the message to the mobile communications device, the message including the pointer to information complementary to the other software application.

12. An apparatus for transmitting data to a mobile communications device, the apparatus comprising:
at least one processor to:
in response to a telephone call initiated from a mobile communications device using an abbreviated dialing code, identify content located external to the mobile communications device associated with the abbreviated dialing code from a plurality of content each associated with a unique abbreviated dialing code;

send a message to the mobile communications device, the message including a pointer to information complementary to the identified content;

identify one or more operational parameters associated with the mobile communications device by polling the mobile communications device in response to the pointer being activated at the mobile communications device and after the telephone call has been initiated, the one or more operational parameters being identified only after the telephone call has been initiated and the one or more operational parameters including at least one of a wireless network carrier identification, a mobile communications device type, a software execution platform, and a software application resident on the mobile communications device; and transmit data associated with the identified content to the mobile communications device in a format compatible with the identified one or more operational parameters, wherein the data associated with the identified content is a ringtone generated from at least a portion of an audio broadcast transmitted to the mobile communications device, the portion of the audio broadcast being determined based on a timing of a request for the ringtone from the mobile communications device during the audio broadcast.

13. The apparatus of claim 12 wherein the one or more operational parameters consist of the software execution platform.

14. An apparatus as in claim 12, wherein the abbreviated dialing code has fewer characters than an ordinary telephone number and comprises a non-alphabetic/non-numeric character as a first character.

15. An apparatus as in claim 12, wherein the abbreviated dialing code has fewer characters than an ordinary telephone number and comprises a # character as a first character.

16. An apparatus as in claim 12, wherein the at least one processor receives the telephone call via a wireless voice network.

17. An apparatus as in claim 12, wherein the abbreviated dialing code is associated with at least one product or service, the content is associated with the at least one associated product or service, and identifying the content comprises identifying the content associated with the at least one associated product or service.

18. An apparatus as in claim 12, further comprising identifying the content using the abbreviated dialing code.

19. An apparatus as in claim 12, wherein the identified content comprises another software application for the mobile communications device.

20. A method comprising:
in response to a voice telephone call initiated from a mobile communications device using an abbreviated dialing code, providing an interactive voice response interface by at least one server to receive a unique designation associated with a user and receive an identification of a desired resource that is associated with the abbreviated dialing code, wherein the abbreviated dialing code has fewer characters than an ordinary telephone number and comprises a non-alphabetic/non-numeric character as a first character;

sending a message to the mobile communications device, the message including a pointer to the desired resource;

polling the mobile communications device from the at least one server in response to the pointer being activated at the mobile communications device and after the voice telephone call has been initiated to determine one or more operational parameters associated with the mobile communications device, the one or more operational parameters being determined only after the voice telephone call has been initiated and the one or more operational parameters including at least one of a wireless network carrier identification, a mobile communications device type, a software execution platform, and a software application resident on the mobile communications device; and transmitting data associated with the desired resource to the mobile communications device in a format compatible with the determined one or more operational parameters, wherein the data associated with the desired resource is a ringtone generated from at least a portion of an audio broadcast transmitted to the mobile communications device, the portion of the audio broadcast being determined based on a timing of a request for the ringtone from the mobile communications device during the audio broadcast.

21. A method as in claim 20, wherein the interactive voice response interface queries the user for the unique designation associated with the user.

22. The method of claim 20, wherein the one or more operational parameters consist of the software execution platform.

23. A method as in claim 20, wherein the abbreviated dialing code comprises a # character as a first character.

24. A method as in claim 20, further comprising receiving the telephone call at the at least one server via a wireless voice network.

25. A method as in claim 20, wherein the abbreviated dialing code is associated with at least one product or service, the desired resource is associated with the at least one associated product or service, and transmitting the data comprises transmitting the data associated with the at least one associated product or service.

26. An apparatus comprising:
at least one processor to:
in response to a voice telephone call initiated from a mobile communications device using an abbreviated dialing code, receive a unique designation associated with a user and an identification of a desired resource that is associated with the abbreviated dialing code, wherein the abbreviated dialing code has fewer characters than an ordinary telephone number and comprises a non-alphabetic/non-numeric character as a first character;
send a message to the mobile communications device, the message including a pointer to the desired resource;
poll the mobile communications device in response to the pointer being activated at the mobile communications device and after the voice telephone call has been initiated to determine one or more operational parameters associated with the mobile communications device, the one or more operational parameters being determined only after the voice telephone call has been initiated and the one or more operational parameters including at least one of a wireless network carrier identification, a mobile communications device type, a software execution platform, and a software application resident on the mobile communications device; and transmit data associated with the desired resource to the mobile communications device in a format compatible with the determined one or more operational parameters, wherein the data associated with the desired resource is a ringtone generated from at least a portion of an audio broadcast transmitted to the mobile communications device, the portion of the audio broadcast being determined based on a timing of a request for the ringtone from the mobile communications device during the audio broadcast.

27. The apparatus of claim 26, wherein the one or more operational parameters consist of the software execution platform.

28. An apparatus as in claim 26, wherein the abbreviated dialing code comprises a # character as a first character.

29. An apparatus as in claim 26, wherein the at least one processor receives the telephone call via a wireless voice network.

30. An apparatus as in claim 26, wherein the abbreviated dialing code is associated with at least one product or service, the desired resource is associated with the at least one associated product or service, and transmitting the data comprises transmitting the data associated with the at least one associated product or service.

31. A method comprising:
in response to a telephone call initiated using an abbreviated dialing code over a wireless voice network from a mobile communications device, identifying, by a first server, content associated with the abbreviated dialing code from a plurality of content each associated with a unique abbreviated dialing code, the content comprising a software application for the mobile communications device associated with at least one product or service;
sending, by the first server to the mobile communications device, a message via a wireless data network, the message comprising a pointer to data associated with the content;
receiving, at a second server from the mobile communications device, a communication seeking the data identified by the pointer;
determining, by the second server, one or more operational parameters associated with the mobile communications device by polling the mobile communications device in response to the pointer being activated at the mobile communications device and after the telephone call has been initiated, the one or more operational parameters being determined only after the telephone call has been initiated and the one or more operational parameters including at least one of a wireless network carrier identification, a mobile communications device type, another software execution platform, and a software application resident on the mobile communications device; and
providing, by the second server to the mobile communications device, data associated with the identified content in a format compatible with the one or more determined operational parameters,
wherein the data associated with the identified content is a ringtone generated from at least a portion of an audio broadcast transmitted to the mobile communications device, the portion of the audio broadcast being determined based on a timing of a request for the ringtone from the mobile communications device during the audio broadcast.

32. The method of claim 31, wherein the one or more operational parameters consist of the software execution platform.

33. A method as in claim 31, wherein the abbreviated dialing code has fewer characters than an ordinary telephone number and comprises a non-alphabetic/non-numeric character as a first character.

34. A method as in claim 31, wherein the abbreviated dialing code has fewer characters than an ordinary telephone number and comprises a # character as a first character.

35. A method as in claim 31, further comprising receiving the telephone call at the at least one first server via a wireless voice network.

36. A method as in claim 31, wherein the abbreviated dialing code is associated with the at least one product or service, the content is associated with the at least one associated product or service, and identifying the content comprises identifying the content associated with the at least one associated product or service.

37. A method as in claim 31, further comprising identifying the content using the abbreviated dialing code.

38. A system comprising:
a first server to:
in response to a telephone call initiated using an abbreviated dialing code on a wireless voice network from a mobile communications device, identify content associated with the abbreviated dialing code from a plurality of content each associated with a unique abbreviated dialing code, the content comprising a software application for the mobile communications device associated with at least one product or service; and
send a message containing a pointer to data associated with the content via a wireless data network;
a second server to:
determine, by polling the mobile communications device in response to the pointer being activated at the mobile communications device and after the telephone call has been initiated, one or more operational parameters associated with the mobile communications device, the one or more operational parameters being determined only after the telephone call has been initiated and the one or more operational parameters including at least one of a wireless network carrier identification, a mobile communications device type, a software execution platform, and another software application resident on the mobile communications device; and
provide data associated with the identified content to the mobile communications device in a format compatible with the one or more determined operational parameters,
wherein the data associated with the identified content is a ringtone generated from at least a portion of an audio broadcast transmitted to the mobile communications device, the portion of the audio broadcast being determined based on a timing of a request for the ringtone from the mobile communications device during the audio broadcast.

39. The system of claim 38, wherein the one or more operational parameters consist of the software execution platform.

40. A system as in claim 38, wherein the abbreviated dialing code has fewer characters than an ordinary telephone number and comprises a non-alphabetic/non-numeric character as a first character.

41. A system as in claim 38, wherein the abbreviated dialing code has fewer characters than an ordinary telephone number and comprises a # character as a first character.

42. A system as in claim 38, wherein the first server receives the telephone call via a wireless voice network.

43. A system as in claim 38, wherein the abbreviated dialing code is associated with the at least one product or service; and the content is associated with the at least one associated product or service.

44. A system as in claim 38, further comprising identifying the content using the abbreviated dialing code.

45. A method for transmitting data to a mobile communications device comprising:
in response to a communication initiated from the mobile communications device using an abbreviated dialing code, identifying, by at least one server, content located external to the mobile communications device associated with the abbreviated dialing code from a plurality of content each associated with a unique abbreviated dialing code;
sending a message to the mobile communications device, the message including a pointer to information complementary to the identified content;
identifying one or more operational parameters associated with the mobile communications device by the at least one server by polling the mobile communications device in response to the pointer being activated at the mobile communications device and after the communication has been initiated, the one or more operational parameters being identified only after the communication has been initiated and the one or more operational parameters including at least one of a wireless network carrier identification, a mobile communications device type, a software execution platform, and a software application resident on the mobile communications device; and
transmitting data associated with the identified content to the mobile communications device in a format compatible with the identified one or more operational parameters,
wherein the data associated with the identified content is a ringtone generated from at least a portion of an audio broadcast transmitted to the mobile communications device, the portion of the audio broadcast being determined based on a timing of a request for the ringtone from the mobile communications device during the audio broadcast.

46. A method as in claim 45, wherein the abbreviated dialing code has fewer characters than an ordinary telephone number and comprises a non-alphabetic/non-numeric character as a first character.

47. A method as in claim 45, wherein the abbreviated dialing code has fewer characters than an ordinary telephone number and comprises a # character as a first character.

48. A method as in claim 45, further comprising receiving the communication at the at least one server via a wireless voice network.

49. A method as in claim 45, wherein the abbreviated dialing code is associated with at least one product or service, the content is associated with the at least one associated product or service, and identifying the content comprises identifying the content associated with the at least one associated product or service.

50. A method as in claim 45, further comprising identifying the content using the abbreviated dialing code.

51. A method as in claim 45, wherein the identified content comprises another software application for the mobile communications device, the method comprising sending the message to the mobile communications device, the message including the pointer to information complementary to the other software application.

52. An apparatus for transmitting data to a mobile communications device, the apparatus comprising:
   at least one processor to:
      in response to a communication initiated from a mobile communications device using an abbreviated dialing code, identify content located external to the mobile communications device associated with the abbreviated dialing code from a plurality of content each associated with a unique abbreviated dialing code;
      send a message to the mobile communications device, the message including a pointer to information complementary to the identified content;
      identify one or more operational parameters associated with the mobile communications device by polling the mobile communications device in response to the pointer being activated at the mobile communications device and after the communication has been initiated, the one or more operational parameters being identified only after the communication has been initiated and the one or more operational parameters including at least one of a wireless network carrier identification, a mobile communications device type, a software execution platform, and a software application resident on the mobile communications device; and
      transmit the data associated with the identified content to the mobile communications device in a format compatible with the identified one or more operational parameters,
      wherein the data associated with the identified content is a ringtone generated from at least a portion of an audio broadcast transmitted to the mobile communications device, the portion of the audio broadcast being determined based on a timing of a request for the ringtone from the mobile communications device during the audio broadcast.

53. An apparatus as in claim 52, wherein the abbreviated dialing code has fewer characters than an ordinary telephone number and comprises a non-alphabetic/non-numeric character as a first character.

54. An apparatus as in claim 52, wherein the abbreviated dialing code has fewer characters than an ordinary telephone number and comprises a # character as a first character.

55. An apparatus as in claim 52, wherein the at least one processor receives the communication via a wireless voice network.

56. An apparatus as in claim 52, wherein the abbreviated dialing code is associated with at least one product or service, the content is associated with the at least one associated product or service, and identifying the content comprises identifying the content associated with the at least one associated product or service.

57. An apparatus as in claim 52, further comprising identifying the content using the abbreviated dialing code.

58. An apparatus as in claim 52, wherein the identified content comprises another software application for the mobile communications device.

59. A method comprising:
   in response to a voice communication initiated from a mobile communications device using an abbreviated dialing code, providing an interactive voice response interface by the at least one server to receive a unique designation associated with a user and an identification of a desired resource that is associated with the abbreviated dialing code, wherein the abbreviated dialing code has fewer characters than an ordinary telephone number and comprises a non-alphabetic/non-numeric character as a first character;
   sending a message to the mobile communications device, the message including a pointer to the desired resource;
   polling the mobile communications device from the at least one server in response to the pointer being activated at the mobile communications device and after the voice communication has been initiated to determine one or more operational parameters associated with the mobile communications device, the one or more operational parameters being determined only after the voice communication has been initiated and the one or more operational parameters including at least one of a wireless network carrier identification, a mobile communications device type, a software execution platform, and a software application resident on the mobile communications device; and
   transmitting the data associated with the desired resource to the mobile communications device in a format compatible with the determined one or more operational parameters,
   wherein the data associated with the desired resource is a ringtone generated from at least a portion of an audio broadcast transmitted to the mobile communications device, the portion of the audio broadcast being determined based on a timing of a request for the ringtone from the mobile communications device during the audio broadcast.

60. A method as in claim 59, wherein the abbreviated dialing code comprises a # character as a first character.

61. A method as in claim 59, further comprising receiving the voice communication at the at least one server via a wireless voice network.

62. A method as in claim 59, wherein the abbreviated dialing code is associated with at least one product or service, the desired resource is associated with the at least one associated product or service, and transmitting the data comprises transmitting the data associated with the at least one associated product or service.

63. An apparatus comprising:
   at least one processor to:
      in response to a voice communication initiated from a mobile communications device using an abbreviated dialing code receive a unique designation associated with a user and an identification of a desired resource that is associated with the abbreviated dialing code, wherein the abbreviated dialing code has fewer characters than an ordinary telephone number and comprises a non-alphabetic/non-numeric character as a first character;
      send a message to the mobile communications device, the message including a pointer to the desired resource;
      poll the mobile communications device in response to the pointer being activated at the mobile communications device and after the voice communication has been initiated to determine one or more operational parameters associated with the device, the one or more operational parameters being determined only after the voice communication has been initiated and the one or more operational parameters including at least one of a wireless network carrier identification, a mobile communications device type, a software execution platform, and a software application resident on the mobile communications device; and transmit the data associated with the desired resource to the mobile communications device in a format compatible with the determined one or more operational parameters, wherein the data associated with the desired resource is a ringtone generated from at least a portion of an audio broadcast transmitted to the mobile communications device, the portion of the audio broadcast being determined based on a timing of a request for the ringtone from the mobile communications device during the audio broadcast.

64. An apparatus as in claim 63, wherein the abbreviated dialing code comprises a # character as a first character.

65. An apparatus as in claim 63, wherein the at least one processor receives the voice communication at the at least one server via a wireless voice network.

66. An apparatus as in claim 63, wherein the abbreviated dialing code is associated with at least one product or service, the desired resource is associated with the at least one associated product or service, and transmitting the data comprises transmitting the data associated with the at least one associated product or service.

67. A method comprising:
in response to a communication initiated using an abbreviated dialing code on a wireless voice network from a mobile communications device, identifying, by a first server, content associated with the abbreviated dialing code from a plurality of content each associated with a unique abbreviated dialing code, the content comprising a software application for the mobile communications device associated with at least one product or service;
sending, by the first server to the mobile communications device, a message via a wireless data network, the message comprising a pointer to data associated with the content;
receiving, at a second server from the mobile communications device, a second communication seeking the data identified by the pointer;
determining, by the second server by polling the mobile communications device in response to the pointer being activated at the mobile communications device and after the communication has been initiated, one or more operational parameters associated with the mobile communications device, the one or more operational parameters being determined only after the communication has been initiated and the one or more operational parameters including at least one of a wireless network carrier identification, a mobile communications device type, a software execution platform, and a software application resident on the mobile communications device; and
providing, by the second server to the mobile communications device, data associated with the identified content in a format compatible with the one or more determined operational parameters,
wherein the data associated with the identified content is a ringtone generated from at least a portion of an audio broadcast transmitted to the mobile communications device, the portion of the audio broadcast being determined based on a timing of a request for the ringtone from the mobile communications device during the audio broadcast.

68. A method as in claim 67, wherein the abbreviated dialing code has fewer characters than an ordinary telephone number and comprises a non-alphabetic/non-numeric character as a first character.

69. A method as in claim 67, wherein the abbreviated dialing code has fewer characters than an ordinary telephone number and comprises a # character as a first character.

70. A method as in claim 67, further comprising receiving the communication at the first server via a wireless voice network.

71. A method as in claim 67, wherein the abbreviated dialing code is associated with the at least one product or service, the content is associated with the at least one associated product or service, and identifying the content comprises identifying the content associated with the at least one associated product or service.

72. A system comprising:
a first server to:
in response to a communication initiated using an abbreviated dialing code on a wireless voice network from a mobile communications device, identify content associated with the abbreviated dialing code from a plurality of content each associated with a unique abbreviated dialing code and send a message containing a pointer to data associated with the content via a wireless data network, the content comprising a software application for the mobile communications device associated with at least one product or service;
a second server to:
determine, by polling the mobile communications device in response to the pointer being activated at the mobile communications device and after the communication has been initiated, one or more operational parameters associated with the mobile communications device, the one or more operational parameters being determined only after the communication has been initiated and the one or more operational parameters including at least one of a wireless network carrier identification, a mobile communications device type, a software execution platform, and a software application resident on the mobile communications device; and
provide data identified by the pointer in a format compatible with the one or more determined operational parameters to the mobile communications device,
wherein the data identified by the pointer is a ringtone generated from at least a portion of an audio broadcast transmitted to the mobile communications device, the portion of the audio broadcast being determined based on a timing of a request for the ringtone from the mobile communications device during the audio broadcast.

73. A system as in claim 72, wherein the abbreviated dialing code has fewer characters than an ordinary telephone number and comprises a non-alphabetic/non-numeric character as a first character.

74. A system as in claim 72, wherein the abbreviated dialing code has fewer characters than an ordinary telephone number and comprises a # character as a first character.

75. A system as in claim 72, wherein the first server receives the communication via a wireless voice network.

76. A system as in claim 72, wherein the abbreviated dialing code is associated with the at least one product or service, the content is associated with the at least one associated product or service, and identifying the content comprises identifying the content associated with the at least one associated product or service.

77. A system as in claim 72, further comprising identifying the content using the abbreviated dialing code.

* * * * *